United States Patent
Patterson

[11] Patent Number: 5,971,659
[45] Date of Patent: Oct. 26, 1999

[54] OIL SPILL RECOVERY ARTICLES AND METHOD

[76] Inventor: James A. Patterson, 2074 20th St., Sarasota, Fla. 34234

[21] Appl. No.: 09/013,754

[22] Filed: Jan. 27, 1998

[51] Int. Cl.$^6$ .................................................. E02B 15/00
[52] U.S. Cl. .............................. 405/60; 210/924; 405/63
[58] Field of Search ........................... 405/60, 61, 52; 210/924, 242.4

[56] References Cited

U.S. PATENT DOCUMENTS

| | | | |
|---|---|---|---|
| 4,959,154 | 9/1990 | Simmons | 210/924 |
| 5,248,391 | 9/1993 | Lunenschloss | 210/924 |
| 5,302,570 | 4/1994 | Newman | 502/401 |
| 5,421,281 | 6/1995 | Beyrouty | 210/924 |
| 5,466,379 | 11/1995 | Schiwek | 210/924 |
| 5,604,012 | 2/1997 | Okamoto et al. | 428/136 |

*Primary Examiner*—Dennis L. Taylor
*Attorney, Agent, or Firm*—Charles J. Prescott

[57] ABSTRACT

Hollow tubular segments, preferably in the form of pretreated hollow core fiber segments, and a method, for gathering or collecting and removing an oil spill floating atop a body of water. The preferably fuel oil-pretreated segments are hydrophobic having a resulting density such that, when disposed atop the oil spill, the pretreated segments absorb or draw the spilled oil by capillary action into the interiors and remain afloat atop the water to prevent further dispersion of the oil spill and to facilitate gathering of the spilled oil filled segments. After use, the spilled oil may be drawn from the segments by heat and/or forced air, the segments then being reusable.

3 Claims, 2 Drawing Sheets

OIL SPILL RECOVERY ARTICLES AND METHOD

BACKGROUND OF THE INVENTION

1. Scope of Invention

This invention relates generally to means for dealing with accidental oil spills on a body of water, and more particularly to a method and means for the gathering and removal of oil spills.

2. Prior Art

An accidental or inadvertent oil spill which occurs on a body of water, whether fresh water or sea water, is potentially very environmentally damaging and very difficult to contain and remove. One currently available technique used for such oil spill accidents is to deploy a floating boundary around the oil spill and then begin to suction the combination of spilled oil and sea water for subsequent separation and retaining of the spilled oil for disposal. However, if the oil spill has spread sufficiently over the body of water, containment may not be practical. Further, weather and wave conditions may make the oil spill dispersion unmanageable at best.

Lab Safety Supply, Inc. of Jamesville, Wis. distributes a number of oil (hydrocarbon) spill maintenance products which either absorb spilled oil or provide a bacterial decomposing product for bioremedial attack of the spilled oil. However, all of these products appear to be directed to land-based oil spills on the ground or other hard surfaces.

The use of hollow fibers in conjunction with the absorption, transfer or displacement of liquids is well known. The following U.S. patents are directed to the use of such hollow fibers:

U.S. Pat. No. 4,805,343 to Patterson, et al.
U.S. Pat. No. 4,860,577 to Patterson
U.S. Pat. No. 4,928,427 to Patterson
U.S. Pat. No. 5,177,897 to Patterson
U.S. Pat. No. 5,303,503 to Patterson The present invention discloses an economical and effective means for gathering, preventing the spread, and the removal of oil spills without the need for chemical interaction with the spilled oil or sea water which may otherwise be environmentally harmful. Preferably hollow core fiber segments are deployed atop the oil spill and absorb large quantities of the oil by capillary action.

BRIEF SUMMARY OF THE INVENTION

This invention is directed to hollow tubular or open-ended segments, preferably in the form of pretreated hollow core fiber segments, and a method, for gathering or collecting and removing an oil spill floating atop a body of water. The preferably fuel oil-pretreated segments are hydrophobic having a resulting density such that, when disposed atop the oil spill, the pretreated segments absorb or draw the spilled oil by capillary action into the interiors and remain afloat atop the water to prevent further dispersion of the oil spill and to facilitate gathering of the spilled oil filled segments. After use, the spilled oil may be drawn from the segments by heat and/or forced air, the segments then being reusable.

It is therefore an object of this invention to provide a product which will economically, quickly and effectively absorb and contain and prevent the spreading of an accidental oil spill on a body of water.

It is another object of this invention to provide a method for containment and removal of crude oil spills on either a fresh or sea water body of water.

It is yet another object of this invention to provide a reusable means for the gathering and removal of accidental oil spills on a body of water.

It is still another object of this invention to provide a means and method for the collecting, removal and reuse of oil spilled on an open body of water.

It is still further an object of this invention to provide an inexpensive and biodegradable means for the gathering and removal of an oil spill on a body of water.

In accordance with these and other objects which will become apparent hereinafter, the instant invention will now be described with reference to the accompanying drawings.

DETAILED DESCRIPTION OF THE INVENTION

Figure 1A:
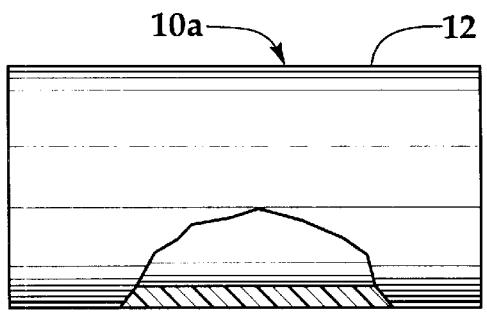
FIG. 1 shows a hollow core fiber segment of the invention shown in broken view at (a) prior to pretreatment; at (b) in full section view after pretreatment; and at (c) after having been filled with spilled oil floating atop a body of water.
Figure 2:
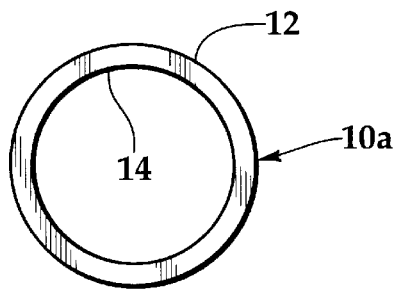
FIG. 2 is an end elevation view of FIG. 1.

Referring now to the drawings, the invention in untreated form is shown generally at numeral 10a in FIG. 1 and comprises a large number of such tubular segments 12. Each of the tubular segments 12 is preferably formed of biodegradable cellulose acetate tubing known as hollow core fiber (HCF) material. The range of dimensions of each of the hollow core fiber segments 12, having an inner cylindrical surface 14, and being open at each end thereof, is in the range of 1 to 10 mm in length, up to 3 mm in diameter and having a wall thickness in the range of 0.05 to 0.15 mm.

Although hollow core fiber segments formed of cellulose acetate is preferred because of the biodegradability of this material when exposed to sunlight over several weeks time period, other materials such as polyethylene tubing may be used so long as the size and density limitations associated therewith as described herebelow are maintained.

Figure 1B:
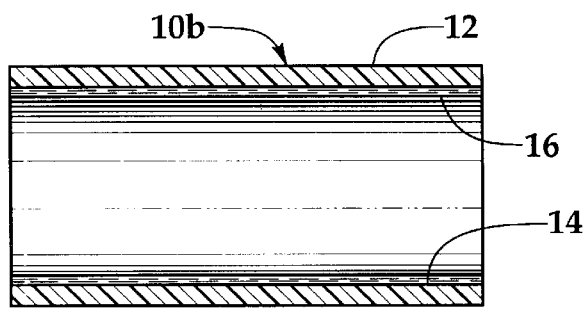
Figure 1C:
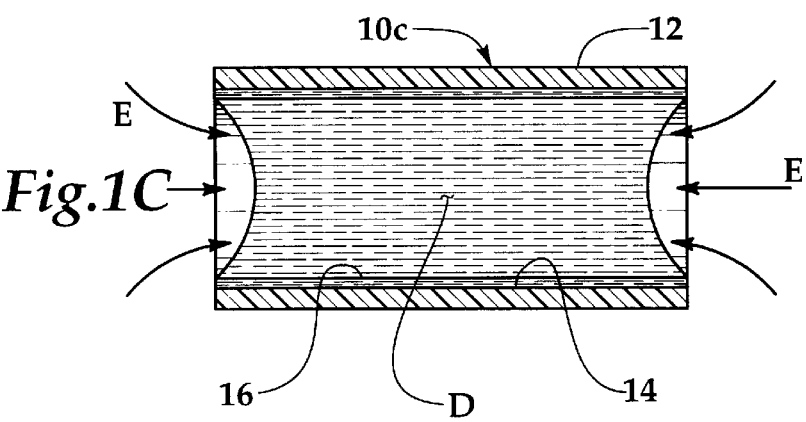

Although not required because cellulose acetate is somewhat hydrophobic to begin with, the preferred embodiment of the invention is pretreated as shown in FIG. 1b at 10b. Each of the hollow core fiber segments 12 are coated, at least on the interior surface 14, with a thin layer of light oil 16 such as #2 diesel fuel. The purpose of this pretreatment is twofold. First, the hydrophobic characteristics of each of the pretreated segments 10b are increased so as to add a further measure that prevents the segments 10b from becoming submerged into the body of water atop which an oil spill is floating. Second, by the addition of the oil pretreatment 16, the spilled oil such as crude oil will more completely fill the interior volume of each of the hollow core fiber segments 12 by wicking or capillary action in the direction of arrows E as shown in FIG. 1c. By this pretreatment, when each of the pretreated hollow core fiber segments 10b are deployed or dispersed atop the spilled oil which floats atop the body of water, the spilled oil will virtually fill the interior volume as at D of each of the now filled with crude oil hollow core fiber segments 10c which minimizes or eliminates trapped air pockets or bubbles. These trapped air bubbles both reduce operating efficiency and decrease net density preventing the segments from sinking into the oil spill layer.

Figure 3:
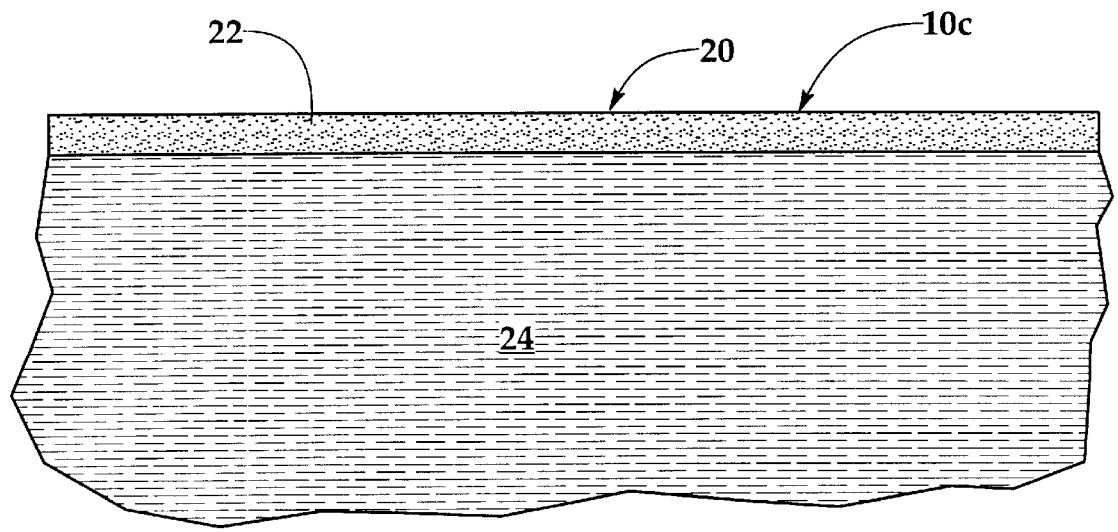
FIG. 3 is a schematic view of the invention deployed into an oil spill which is floating atop a body of water.

In FIG. 3, a vast number of pretreated hollow core segments 10c has been dispersed atop a floating layer of spilled oil 22. After allowing each of the pretreated hollow core fiber segments to remain in the floating spilled oil 22, they fill with the spilled oil as in FIG. 1(c) and form a somewhat mechanically attached (also by capillary action) floating layer or blanket shown generally at numeral 20 as a mixture or blend of spilled oil-filled hollow core fiber segments 10c and remaining unabsorbed spilled oil 22.

Once this blanket 20 formed of spilled oil-filled hollow core fiber segments 10c and remaining unabsorbed spilled oil 22, if any, has been allowed to interact for a time period sufficient to fill all of the hollow core fiber segments, gathering may then take place. One means for accomplishing the gathering is to use a surface removal process such as the dragging of an open mesh screen scoop having a mesh size of 10 to 16 mesh (strands per inch) across this layer 20.

Once the spilled oil-filled hollow core fiber segments 10c have been gathered, the spilled oil may be released therefrom by either heating or by forced air being blown thereacross while the segments are supported on a screen support surface. When a sufficient, if not all, quantity of spilled oil is removed from each of the hollow core fiber segments, they are reusable for further spilled oil absorption on a repeated basis after each de-oiling operation.

Lab Efficiency Tests

A simple test to evaluate the efficiency of this invention utilizing crude oil floating atop fresh tap water was conducted. Hollow core fiber segments which had been cleaned and dried were utilized. These segments had a length of 1 to 2 mm having a total weight of 1.62 g. These segments were emptied into a plastic container which had been filled with fresh water and approximately 51 g of crude oil. The contents of this container were allowed to sit for approximately five minutes. During this time period, an infrared lamp was directed at the container for a period of two minutes to simulate sunlight heat for improved efficiency. It was determined after this heating that all gas bubbles within the hollow core fiber segments had been eliminated so that they were completely filled with the crude oil.

An aluminum screen was pulled through the upper layer of water and oil and hollow core fiber segments. The weight of the hollow core fiber segments, now filled with crude oil, was then determined from which it was determined that a total of 9.82 g of oil have been absorbed by capillary action into the 1.62 g of hollow core fiber segments. Correcting for the pretreatment oil, the total crude oil absorbed showed a net of 9.01 g. An alternate water balance check was also made wherein the total container filled with water, the weight of the crude oil added and the final weight of the container showed a net oil uptake of 15 g. In a weight efficiency comparison, 1.62 g of hollow core fiber segments absorbed between 9.01 and 15 g of crude oil, resulting in an efficiency of between 556% to 938%.

Densities

The relative densities of the hollow core fiber segments (or material substitution therefor), the fresh water or sea water, the pretreatment oil, and the oil spill itself must be taken into consideration in optimizing the selection of size in terms of length by inside diameter wall thickness and material densities of the hollow tubular segments. The following densities are utilized:

| | |
|---|---|
| Crude Oil | 0.886 g/cm$^3$ |
| Sea Water | 1.02 |
| Hollow Core Fiber Material | 1.20 |
| Hollow Core Fiber Segments & Air | 0.1 |
| Fresh Water | 1.0 |

Because oil spills on a body of water remain at the surface of the water, a very important aspect of this invention is that the tubular segments (preferably hollow core fiber) need to have a resulting density, when filled with the spilled oil (typically crude oil), of no greater than the density of the body of water, whether fresh or salt water. Because the spilled crude oil is slightly less than the body of water, and the cellulose acetate utilized to form the hollow core fiber segments (or substitution) has a density of 1.2, somewhat greater than the density of the body of water, the combination of the hollow core fiber segments and spilled crude oil which is drawn into and fills each of these segments by capillary action, must not exceed that of the water density.

Figure 4:
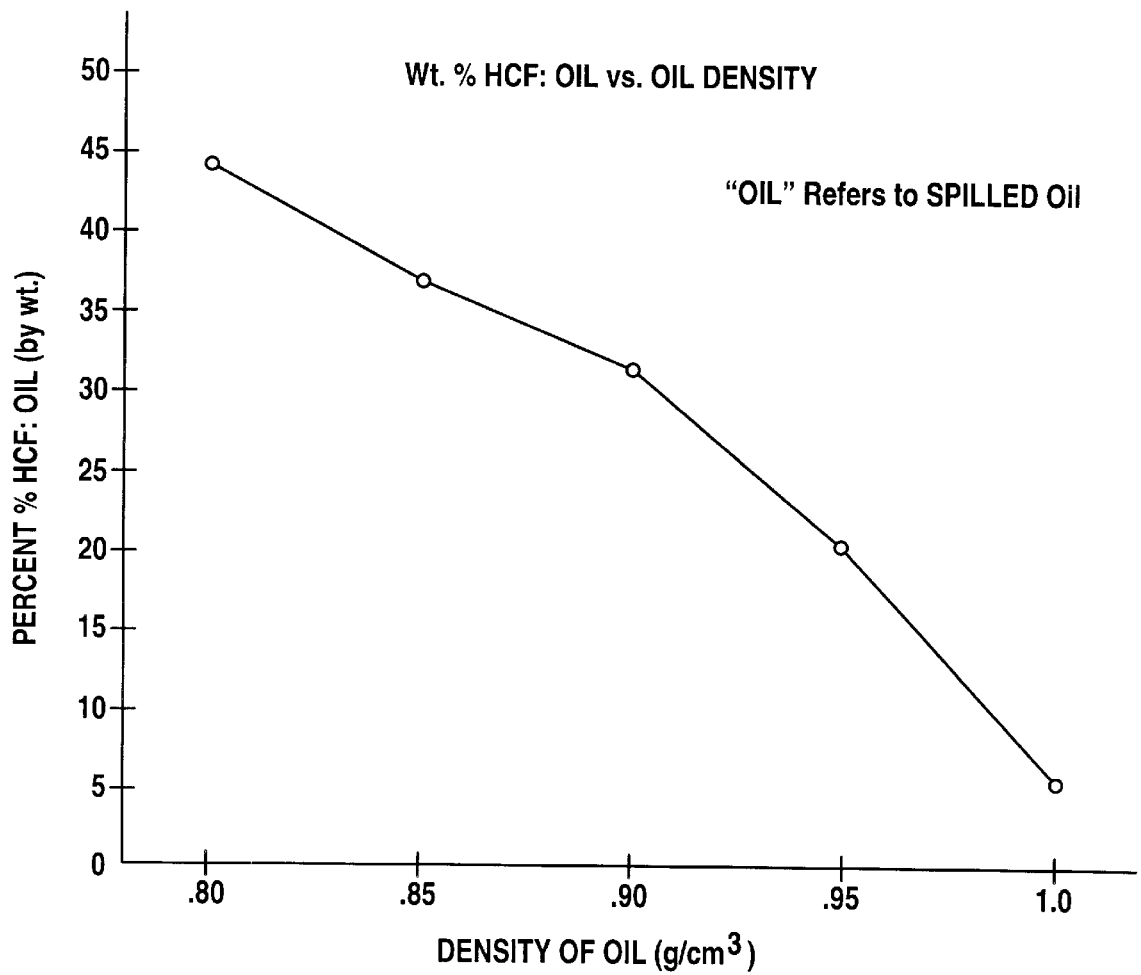
FIG. 4 is a graph showing a relationship (ratio) between the weight of each hollow core fiber segment and the weight of the spilled oil versus the range of densities of the spilled oil.

Referring now to FIG. 4, a somewhat generalized tool is graphically provided for this purpose. FIG. 4 is a graphic representation of the relationship between the overall weight of each hollow core fiber segment shown as a ratio of the weight of the total volume of oil absorbable by each of the segments versus the density of the oil. Here oil is referred to as the "spilled oil" which is floating atop the body of water.

From FIG. 4, it is clearly evident that the higher the density of spilled oil, the lower the weight ratio between each hollow core fiber segment and spill oil absorbed. A simple formula was developed and is utilized to derive the graph of FIG. 4 as follows:

$$1.27\, X - D\,(x+1) = 1.015 \text{ g/cm}^3$$

where
avg. density of sea water=1.015 g/cm$^3$
D=density of spilled oil in g/cm$^3$
density of HCF=1.27 g/cm$^3$
I.D.=0.9 mm
wt=0.48 g/ft.
X=HCF fractional weight ratio to spilled oil Thus, by the above formula, the graph of FIG. 4 may be generated for any particular size and density of hollow core fiber segments (or substitutions therefor) to ensure that each of the segments, when filled with the intended spilled oil, will not sink below the level of the oil spill into the water.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A process for recovering an oil spill floating on a body of water comprising the steps of:

A. pretreating loose hollow core fiber segments, each having a substantially smooth, uninterrupted wall surface and open at each end thereof and becoming hydrophobic, by coating substantially all interior surfaces thereof with light oil, said segments having an initial density in the range of about 1.1 to 1.2 g/cc after said pretreating;

said segments each have a length of up to about 10 mm and an inside diameter of up to about 5 mm;

B. dispersing said hollow fibers atop the oil spill;

C. allowing said segments to remain with the oil spill for a time period sufficient for a substantial portion of said segments to become substantially filled with spilled oil and thereby attaining a resultant density slightly less than or equal to that of the body of water;

D. collecting and removing said segments containing spilled oil from the body of water.

2. A process for recovering an oil spill from atop a body of water comprising the steps of:

A. pretreating loose tubular segments, each having a substantially uniform, uninterrupted wall surface and open at each end thereof, by coating substantially all interior surfaces thereof with fuel oil, said segments becoming hydrophobic thereby;

said segments having a length of up to about 10 mm and an inside diameter in the range of up to about 5 mm;

B. deploying said segments atop the oil spill;

C. allowing said segments to remain with the oil spill for a time period sufficient for said segments to become filled with spilled oil to attain a resultant density no greater than that of the body of water;

D. gathering and removing said segments from the body of water.

3. Pretreated hollow core fiber segments which each absorb by capillary action, and become substantially filled with, oil spilled and floating atop a body of water comprising:

individual tubular segments of hollow core fibers each having a substantially smooth, uninterrupted wall surface and open at each end thereof;

each said segment pretreated to be hydrophobic by coating surfaces thereof with fuel oil, said pretreated segments having an initial density substantially greater than that of the body of water;

each said pretreated segment sized in length and width which, after dispersion atop the spilled oil, has a filled density of slightly less than or equal to that of the body of water;

said segments each having a length of up to about 10 mm and an inside diameter of up to about 5 mm.

\* \* \* \* \*